Jan. 30, 1962  F. AAGAARD  3,018,793

FLUID THROTTLING VALVE

Filed Aug. 5, 1958

INVENTOR.
FRIDTJOF AAGAARD

United States Patent Office 3,018,793
Patented Jan. 30, 1962

---

3,018,793
FLUID THROTTLING VALVE
Fridtjof Aagaard, Rahway, N.J., assignor to American Cyanamid Company, New York, N.Y., a corporation of Maine
Filed Aug. 5, 1958, Ser. No. 753,359
2 Claims. (Cl. 137—595)

This invention relates to an improved throttling device or control valve for varying the flow of fluid through a conduit.

Remote control, either manual or automatic, of the flow of fluid through a conduit presents no particular problem where the flow is very large, other than that inherent in the nature of the fluids which may be corrosive, deposit scale or the like. When, however, it is attempted to control from a distance relatively smaller flows, for example from .05 liter to 5 liters or more per minute, the problem became serious. Throttling of the flow through a conduit required relatively small orifices which clogged easily and made a control of the flow of scale depositing fluids or suspension of solids in liquids very unreliable. The problem of preventing clogging by reason of small orifices was solved by the throttling device described and claimed in my Patent 2,582,917 of January 15, 1952. In this device a helix of a number of turns of deformable conduit around a mandrel was compressed between plates, one of which slides on guide rods and is moved by an expandable tube. This throttling device presents a certain amount of friction and, while it does not have the serious clogging problems of a single orifice, once clogging takes place, the throttling device does not readily clean itself.

In my earlier Patents 2,517,820, August 8, 1950, and 2,734,526, February 14, 1956, I have described somewhat different control elements in which a plate swings compressing a deformable conduit. These devices are not so well suited for flows that are intermediate between extremely small flows and larger flows and the same friction militates against precise control and causes hunting when there is a fluctuation in pressure on the upstream side of the conduit.

The present invention is directed to an improved type of control valve which is particularly suitable to intermediate flows, which has practically no friction, is capable of a very accurate maximum setting and which is capable of self-cleaning in case of clogging over very wide limits. Essentially the control device comprises a deformable resilient conduit, a constricting element such as a half-round arbor and a plate attached to a flattened portion of a closed end deformable conduit, the plate being connected to the arbor through threaded screws. Although both the plate and the constricting element are capable of considerable side-play as well as movements in a direction to reduce or increase the orifice in the conduit and thus the device is substantially friction free, in actual operation the moving parts are stabilized against any considerable sidewise movement and operate substantially only in a vertical direction. Control is delicate, there is no hunting and response to changes of control pressure is instantaneous.

Another very important advantage of the throttling device of the present invention is that it may be applied to flexible conduit without cutting the latter, something which is not readily possible with most types of flow control devices. This possibility of applying the throttling valve to deformable tubing without cutting the same is of great importance in the laboratory where the present invention is particularly useful, since it can be applied to equipment after it has been set up without any dismantling.

It is possible to control flow by means of the present invention in three ways, a predetermined maximum flow may be restricted by the controller, a predetermined minimum flow or normally shut off condition may be increased at will or, finally, it is possible to control the flow in two conduits at the same time, one being increased as the other is decreased, which is of importance in certain balancing flow problems.

The invention will be described in conjunction with the drawings in which.

Figure 1:
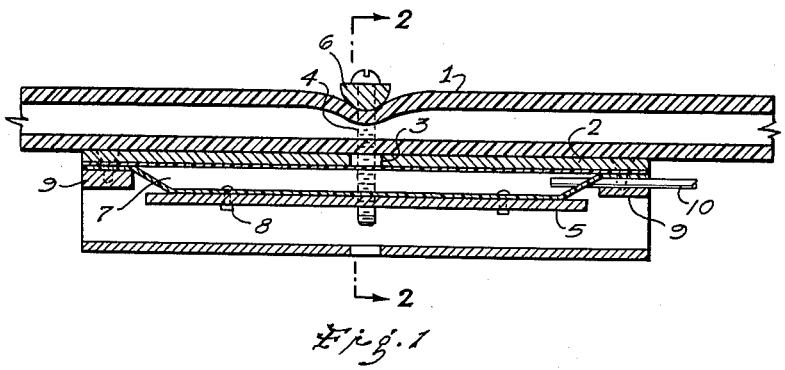
FIGURE 1 is a horizontal section through a controller adapted to reduce a predetermined maximum flow.
Figure 2:
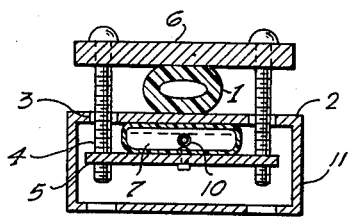
FIGURE 2 is a vertical section along the lines 2—2 of FIGURE 1.

In the device shown in FIGURES 1 and 2, a deformable flexible tubing 1 passes along a clamping plate 2 with two large openings 3 through which threaded bolts 4 pass and screw into a movable control plate 5. The bolts pass through a half-round constricting arbor 6 across the tubing and the plate 5 is attached to a closed end section of the deformable tubing constituting a movable wall of a control chamber 7 by rivets 8. One end is closed by clamping between a block 9 and the plate 2 which form the top of a vented open end box 11. In the other end the tubing 7 communicates through a pipe 10 to a source of control pressure (not shown).

In operation the bolts 4 are turned down to provide a predetermined maximum flow through the conduit 1 when there is present a low pressure in the deformable control chamber 7. Increase of the control pressure in 7 after reaching a certain minimum figure causes the chamber 7 to expand, moving the plate 5 and with it the bolts 4 and arbor 6, which results in decreasing the opening in the conduit 1. A very accurate and delicate control of flow is obtained up to the point at which it is entirely cut off.

Since the openings 3 are very large in proportion to the diameter of the bolts 4, the bolts and the control plate 5 are not laterally restricted and do not slide along guides or through narrow openings so that there is substantially no friction. The device therefore operates with great sensitiveness and with a minimum of hunting. The response to changes in control pressure is immediate and smooth.

Of course, there is a limit to the self-cleaning feature because when the conduit 1 has raised the bolt to the point that the chamber within tubing 7 is completely collapsed, no larger orifice in the tubing 1 can be produced. However, for ordinary operation, the amount of clogging encountered is well within the limits through which the device is self-cleaning.

As was noted, the control or throttling valve can be applied to the flexible tubing after the same has been assembled and at any point therein. It is not necessary to cut the conduit at any time, nor is it necessary that the valve be mounted at any particular point on the tubing, provided of course there is room for the box 11. A very great flexibility is thereby effected, which is an important advantage of the present invention. In the device shown in FIGURES 1 and 2, there is a predetermined maximum flow which is adjusted by screwing in the bolts 4 to a greater or lesser degree. Control pressure serves to close down the orifice in the tubing and therefore to restrict flow.

Figure 3:
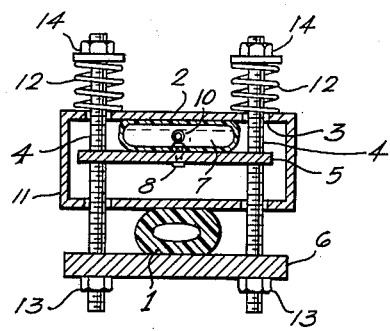
FIGURE 3 is a vertical section through a controller which provides gradual opening from a predetermined minimum flow.

FIGURE 3, in which the same parts bear the same reference numerals, is a modification in which flow is ordinarily shut off or adjusted to a predetermined minimum and control pressure is used to open the restriction in the conduit and to cause increased flow up to a predetermined maximum. As in FIGURES 1 and 2, the control chamber 7 is riveted to a control plate 5 and bears against plate 2 of the box 11. The same large openings 3 are present in both top and bottom of the box and through these openings extend elongated bolts 4, threaded at both ends. At the lower end of each bolt the constricting arbor 6 bearing on the deformable tube 1 is fastened with adjusting nuts 13, and at the other end springs 12 bearing on the plate 2 are mounted by means of the nuts and washers 14. In the modification of FIGURE 3 the plate 5 is rigidly attached to the two bolts 4 so that it moves with them.

In operation, if there is no pressure in the deformable chamber 7, spring pressure 12 causes the bolts 4 to move the arbor 6 to pinch the conduit 1. Depending on spring strength and adjustment of the nuts and washers 14, this may result in a very small orifice in the conduit 1 defining a minimum flow or it may completely close the conduit. In any event, increase of control pressure in the chamber 7 causes the latter to expand, moving the plate 5 and with it the bolts 4 against the pressure of the springs 12 and results in an increased flow through the conduit 1. The large openings 3 permit movement of the bolts 4 without at any time touching the sides of the openings so that this modification is just as friction free as that shown in FIGURES 1 and 2.

Figure 4:
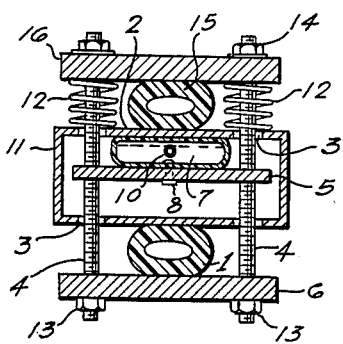
FIGURE 4 is a vertical section through a controller which varies the flow through two conduits in reverse phase.

FIGURE 4, in which corresponding parts bear the same numerals as in FIGURE 3, provides for an increase of flow from a predetermined minimum or shut off in the conduit 1 in the same manner as described in connection with FIGURE 3. However, there is provided two additional elements, deformable conduit 15 and a second arbor 16. The conduit bears on the other side of the plate 2 and the arbor 16 is attached to the bolts 4 above the springs 12. In operation, the initial adjustment by means of the nuts 13 and 14 provides for a predetermined maximum flow in conduit 15 and a predetermined minimum flow in conduit 1. As control pressure is increased, the flow in conduit 1 increases because the expansion of the chamber 7 forces the plate 5 and bolts 4 downwardly against the pressure of the springs 12 and at the same time this motion causes the arbor 16 to pinch the second conduit 15 thereby reducing its flow as the flow in conduit 1 is increased.

The advantages of the present invention in permitting very accurate flow is shown in the following example in which the conduit 1 is a polyvinyl chloride conduit having a 5/16" inside diameter and 3/32" wall thickness. When used with water having a 27" pressure drop across the restriction caused by the arbor 6, various flows were obtained with different pressures in the expanding chamber 7 as shown in the following table:

| Pressure Drop Across Valve | Control Pressure | Flow, ml./min. |
|---|---|---|
| 27" water | 0 | 3,750 |
| | 1 | 3,750 |
| | 2 | 3,750 |
| | 3 | 3,750 |
| | 4 | 3,625 |
| | 5 | 3,250 |
| | 6 | 2,800 |
| | 7 | 2,100 |
| | 8 | 1,250 |
| | 9 | 550 |
| | 10 | 75 |
| | 10.7 | 0 |

It will be noted that there is a certain minimum control pressure, in this case 3 pounds per square inch, before flow control starts and a very smooth control is obtained down to 550 ml. per minute. Thereafter the operation of the valve is much quicker but still reliable, complete shut off resulting at 10.7 pounds per square inch.

It will be noted that the area of the expandable control chamber 7 in contact with the plates varies with its spacing and it is possible to achieve results with conduits of a widely varying size using the same control valve set up, the adjustment being effected either by the threaded bolts 4 in the modification shown in FIGURES 1 and 2 or by the nuts 13 and 14 in the modification shown in FIGURES 3 and 4.

I claim:
1. A fluid throttling valve comprising in combination a box having two parallel outer walls with two sets of aligned openings therein, a floating control plate within said box having a pair of bolts attached thereto and passing through and freely movable in said openings, one of said parallel walls constituting a clamping plate carrying on its outer surface and passing between said bolts a deformable conduit for said fluid, an arbor attached across one pair of the protruding ends of said bolts and engaging said conduit on the side opposite said clamping plate, the other parallel wall carrying spring means attached to the opposite ends of said bolts and tending to cause them to move said arbor towards said clamping plate, means including an expandable chamber attached to the control plate and located between said plate and said other parallel wall for moving said arbor away from the clamping plate in opposition to the thrust of said spring means, and means for varying the volume of said expandable chamber and thereby actuating said valve.

2. A fluid throttling valve according to claim 1 wherein a second arbor is attached across the opposite ends of the bolts outwardly of the spring means and a second deformable conduit passes between said second arbor and the adjacent outer surface of the box whereby said second conduit is throttled when the volume of the expandable chamber is increased.

References Cited in the file of this patent
UNITED STATES PATENTS
2,471,623    Hubbell    May 31, 1949
2,582,917    Aagaard    Jan. 15, 1952
FOREIGN PATENTS
208,807    Switzerland    of 1940